(12) United States Patent
Huang et al.

(10) Patent No.: US 7,363,224 B2
(45) Date of Patent: Apr. 22, 2008

(54) METHOD FOR ENTERING TEXT

(75) Inventors: Xuendong D. Huang, Bellevue, WA (US); Alejandro Acero, Bellevue, WA (US); Kuansan Wang, Bellevue, WA (US); Milind Mahajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 10/748,404

(22) Filed: Dec. 30, 2003

(65) Prior Publication Data

US 2005/0149328 A1  Jul. 7, 2005

(51) Int. Cl.
*G10L 15/04* (2006.01)
(52) U.S. Cl. .................. 704/252; 704/231; 704/235; 704/270; 704/9
(58) Field of Classification Search ............. 704/231, 704/235, 252, 9, 10, 270–275; 715/534, 715/816, 533, 532, 864
See application file for complete search history.

(56) References Cited

U.S. PATENT DOCUMENTS

| | | | | | |
|---|---|---|---|---|---|
| 5,031,206 | A | * | 7/1991 | Riskin | 379/93.27 |
| 5,303,299 | A | * | 4/1994 | Hunt et al. | 379/88.01 |
| 5,634,134 | A | * | 5/1997 | Kumai et al. | 715/536 |
| 5,787,230 | A | * | 7/1998 | Lee | 704/235 |
| 6,018,736 | A | * | 1/2000 | Gilai et al. | 707/6 |
| 6,092,043 | A | * | 7/2000 | Squires et al. | 704/251 |
| 6,223,158 | B1 | * | 4/2001 | Goldberg | 704/252 |
| 6,405,172 | B1 | * | 6/2002 | Baker et al. | 704/270 |
| 7,010,490 | B2 | * | 3/2006 | Brocious et al. | 704/275 |
| 7,124,085 | B2 | * | 10/2006 | Junqua et al. | 704/270.1 |
| 7,174,288 | B2 | * | 2/2007 | Ju et al. | 704/2 |
| 2003/0115057 | A1 | | 6/2003 | Junqua et al. | 704/235 |
| 2003/0212563 | A1 | | 11/2003 | Ju et al. | 704/277 |

FOREIGN PATENT DOCUMENTS

| | | |
|---|---|---|
| EP | 1 544 719 | 6/2005 |
| GB | 2 365 188 | 2/2002 |
| WO | WO 99/00790 | 1/1999 |
| WO | WO 01/03123 | 1/2001 |
| WO | WO 02/05263 | 1/2002 |

OTHER PUBLICATIONS

U.S. Appl. No. 09/822,564, filed Mar. 30, 2001.
F. Jelinek, "Self Organized Language Modeling for Speech Recognition", Language Processing for Speech Recognition, pp. 450-503.

(Continued)

*Primary Examiner*—Vijay Chawan
(74) *Attorney, Agent, or Firm*—Westman, Champlin & Kelly, P.A.

(57) ABSTRACT

In a method of entering text into a device a first character input is provided that is indicative of a first character of a text entry. Next, a vocalization of the text entry is captured. A probable word candidate is then identified for a first word of the vocalization based upon the first character input and an analysis of the vocalization. Finally, the probable word candidate is displayed for a user.

25 Claims, 6 Drawing Sheets

OTHER PUBLICATIONS

K. Seymore et al., "Scalable Backoff Language Models", In Proc. ISCLP, vol. 1, pp. 232-235, Philadelphia, 1996.

Stolcke, "Entropy-based Pruning of Backoff Language Models", Proc. DRAPA News Transcription and Understanding Workshop, pp. 270-274, Lansdowne, VA.

Chen et al., "An Empirical Study of Smoothing Techniques for Language Modeling", TR-10-98, Computer Science Group, pp. 1-64, Harvard University, 1998.

Lehikoinen et al., "BinScroll: A Rapid Selection Technique for Alphanumeric Lists", CHI 2000, pp. 261-262, Apr. 1-6, 2000.

Ahlberg et al., "The Alphaslider: A Compact and Rapid Selector", Proc. CHI 94, p. 365-371.

* cited by examiner

METHOD FOR ENTERING TEXT

FIELD OF THE INVENTION

The invention relates generally to a method of entering text into a device. More particularly, the invention relates to character input assisted vocalized text entry into a device.

BACKGROUND OF THE INVENTION

Small computing devices such as mobile phones and personal digital assistants (PDA's) are used with an ever increasing frequency. The computing power of these devices has allowed them to be used to access and browse the internet as well as store contact information, review and edit text documents, and perform other tasks. Additionally, it has become very popular to send and receive text messages with mobile devices. For example, The Short Message Service (SMS) for mobile phones has been a tremendous success in the text messaging roadmap and the recently introduced Enhanced Messaging Service (EMS), an application-level extension of SMS, is expected to offer a smooth transition to the forthcoming Multimedia Messaging Service (MMS). As a result, these devices provide many applications in which text entry is required. Unfortunately, such text entry on mobile devices can be cumbersome because they lack a standard full-sized keyboard.

Currently, there are two common ways to achieve text input using numeric key pads found on most mobile phones, a multiple-tap approach, and a single-tap approach. With the multiple-tap approach, a user presses a numeric key a number of times to enter the desired letter, where most of the numeric keys are mapped to three or four letters of the alphabet. For example, the two key is usually mapped to the letters A, B, and C. If the user presses the two key once, the letter A is entered. If the user presses the two key twice, the letter B is entered, and if the user presses the two key three times, the letter C is entered. Pauses between entry of successive letters of a word are sometimes necessary so that the device knows when to advance the cursor to the next letter-entry position. For example, to enter the word "cab," the user presses the two key three times to enter the letter C, pauses, presses the two key once to enter the letter A, pauses again, and presses the two key twice to enter the letter B. Other keys that are present on numeric keypads, such as the pound ("#") and asterisk ("*") keys, among other keys, are typically mapped to enter symbols, or switch between uppercase and lower-case letters.

While the multiple-tap approach is usable in that users can enter any word using only the numeric keys, it is disadvantageous for quick and intuitive text entry. A word such as "cab" that only requires three key presses on a standard keyboard, one for each letter, requires six key presses on numeric keys using the multiple-tap approach. As compared to using a standard keyboard, using numeric keys with the multiple-tap approach to achieve text entry means that the user presses many keys even for short messages. Furthermore, errors can be frequent. For example, if the user intends to enter the letter B, but pauses too long between the first and second presses of the two key, two letters A will be entered instead. The device in this case interprets the pause as the user having finished with the current letter entry, an A, and proceeds to the next letter-entry position, where it also enters an A.

Another approach to text entry using numeric keys is the single-tap-dictionary approach, such as "T9", popularized by a company called Tegic. Under the single-tap approach, the user presses the numeric key associated with the desired letter once, even though the numeric key may be mapped to three or four different letters. When the user is enters a number sequence for a word, the device attempts to discern the word that the user intended to enter, based on the number sequence. Each number sequence is mapped to a common word that corresponds to the sequence. For example, the number sequence 43556 can potentially correspond to any five-letter word having a first letter G, H, or I, since the four key is usually mapped to these letters. Similarly, the sequence potentially corresponds to any five-letter word having a second letter D, E, or F, a third and fourth letter selected from the letters J, K, and L, and a fifth letter M, N, or O, since the three, five, and six keys are usually mapped to these respective letters. However, because the most common five-letter word corresponding to the number sequence 43556 is the word "hello," the single-tap approach may always enter this word when the user presses the four, three, five, five, and six keys in succession to input this number sequence.

The single-tap approach has advantages over the multiple-tap approach, but presents new disadvantages. Advantageously, the single-tap approach ensures, with a high probability, that the user only has to press the same number of keys as the number of letters in a desired word. For example, the multiple-tap approach requires the user to press the two key six times to enter the word "cab." Conversely, the single-tap approach potentially only requires the user to press the two key three times to enter this word, assuming that the number sequence 222 is mapped to the word "cab." Therefore, the single-tap approach is more key-efficient than the multiple-tap approach for text entry using numeric keys. It is almost as key-efficient as using a standard keyboard that has a single key for each letter.

The single-tap approach is disadvantageous in that the word mapped to a given number sequence may not be the word the user intended to enter by inputting the sequence. For example, the numeric key sequence 7333 corresponds to both the words "seed" and "reed." Because only one word is mapped to each numeric key sequence, the word "seed" may be entered when the user keys in the numeric key sequence 7333, whereas the user may have intended to enter the word "reed." The single-tap approach is primarily useful where there is only one unique word for a given numeric key sequence, or, if there are a number of words for a given sequence, when the user wishes to input the most, common word associated with the sequence. Where the word mapped by the single-tap approach is not the intended word, text entry may revert back to the multiple-tap approach or to an error-correction mode. Ultimate text entry of the intended word may then require more keystrokes than if the user had started with the multiple-tap approach.

Another method of entering text outside of the use of a conventional keyboard is through the use of a speech recognition system. In such systems, the user vocalizes the text entry, which is captured by the computing device through a microphone and digitized. Spectral analysis is applied to samples of the digitized captured speech and feature vectors or code words are generated for each sample. Output probabilities can then be computed against statistical models such as Hidden Markov Models, which are later used in executing a Viterbi decoding process or similar type of processing technique. An acoustic model that represents speech units is searched to determine the likely phonemes that are represented by the feature vectors or code words and, hence, the utterance received from the user of the system. A lexicon of vocalized word candidates is searched to determined the word that most likely represents the feature vector or code words. Additionally, language models can be used to improve the accuracy of the word produced by the speech recognition system. Language models generally operate to improve the accuracy of the speech recognition system by limiting the candidate words to those that are most likely base upon preceding words. Once the words of the captured vocalized text entry are identified, they are entered as text in the computing system.

Speech recognition systems require significant processing power in order to process the vocalized text entry and produce reasonably accurate results. Although mobile devices of the future may be capable of implementing such speech recognition systems, present mobile computing devices lack the necessary processing power to do so in a useful manner. Additionally, mobile computing devices typically lack the memory capacity that is required for large vocabulary continuous speech recognition. Accordingly, mobile computing devices have relied upon the text entry methods discussed above that utilize limited keyboards.

There is a continuing demand for improved methods of entering text into devices including mobile computing devices.

SUMMARY OF THE INVENTION

The invention generally relates to a method of entering text into a device. In the method, a first character input is provided that is indicative of a first character of a text entry. Next, a vocalization of the text entry is captured. A probable word candidate is then identified for a first word of the vocalization based upon the first character input and an analysis of the vocalization. Finally, the probable word candidate is displayed for a user.

DETAILED DESCRIPTION OF ILLUSTRATIVE EMBODIMENTS

The present invention generally relates to a method for entering text into computing devices. Although the method of the present invention can be implemented in computing devices that include a conventional full-sized keyboard, it is most useful when used in connection with mobile computing devices that lack such a keyboard.

Figure 1:
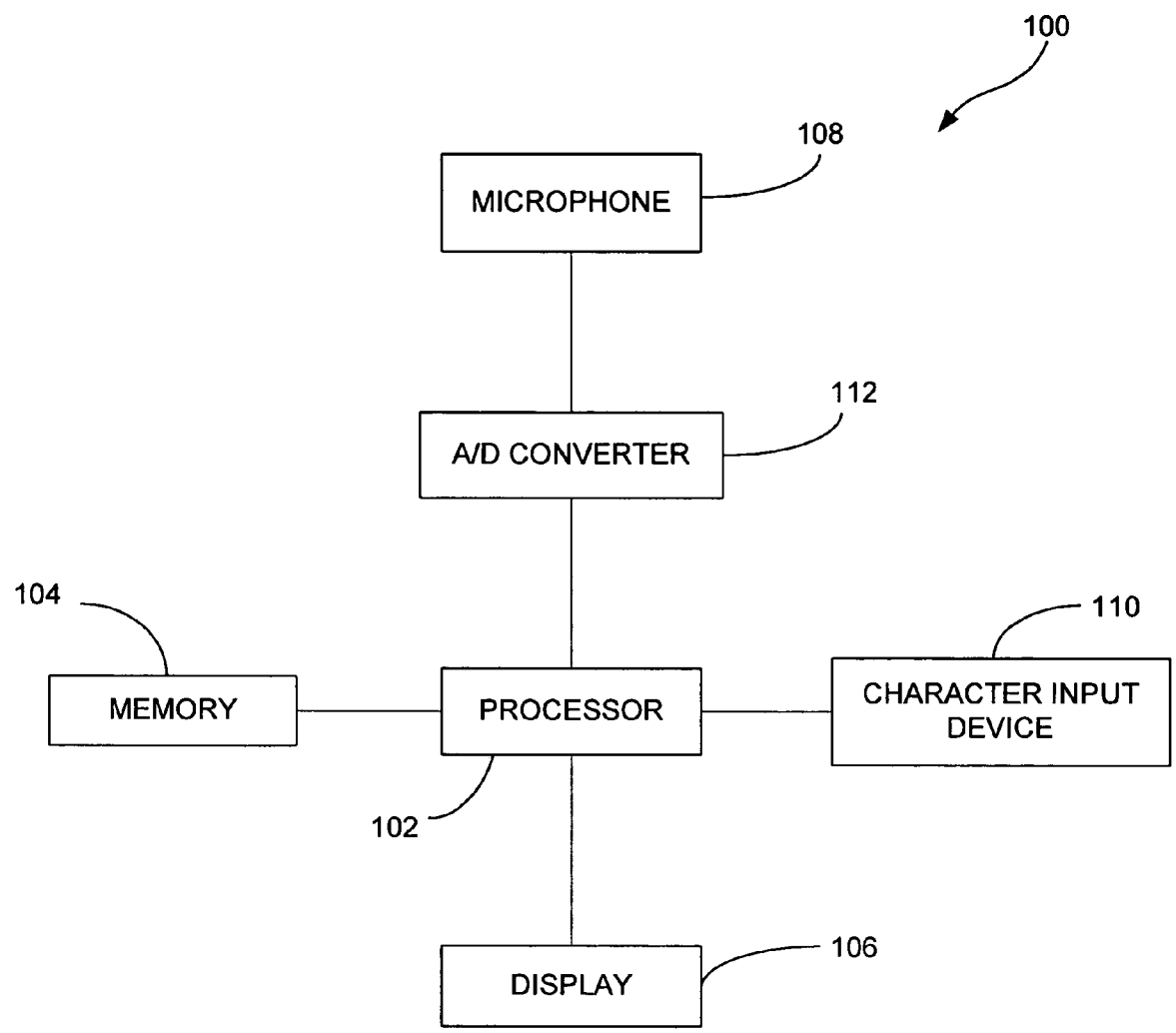
FIG. 1 is a simplified block diagram of an exemplary computing device in which the invention can be used.

FIG. 1 is a block diagram of an exemplary computing device 100 in which the invention can be implemented. Device 100 can be a mobile computing device such as, for example, a mobile phone, a personal digital assistant (PDA), a mobile storage system (e.g., MP3 player), a remote control, and other mobile computing devices that lack a conventional full-sized keyboard. Device 100 is only one example of a suitable computing environment for the present invention and is not intended to suggest any limitation as to the scope of use or functionality of the invention. Additionally, device 100 should not be interpreted as having any dependency or requirement relating to any one or combination of the components illustrated in FIG. 1.

Device 100 can include a controller or processor 102, a computer or machine-readable memory 104, a display 106, a microphone 108, and a character input device 110. Memory 104 is a machine-readable memory that can be accessed by processor 102. Memory 104 can comprise volatile and non-volatile memory storage technologies, and can be configured for removal from device 100 or fixed therein. For example, memory 104 can include, but is not limited to, RAM, ROM, EEPROM, flash memory or other memory storage device.

Memory 104 is configured to store instructions, such as program modules, that can be executed by processor 102 to implement the method of the present invention. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

Processor 102 is configured to display text and images on display 106 in accordance with conventional computing device operations. Display 106 can be any suitable display. For mobile computing devices, display 106 is typically a small, flat display, such as a liquid crystal display (LCD) that can also be touch-sensitive. Alternatively, display 106 can be a larger display, such as a cathode-ray tube (CRT) display, or other type of larger display, such as a large flat panel display.

Microphone 108 of device 100 can be used by a user to input a vocalization. The vocalization is preferably converted to digital form by an analog-to-digital (A/D) converter 112. As will be discussed below in greater detail, device 100 can process the digitized vocalization to extract probable word candidates that are contained in the vocalization. This is generally accomplished by executing a speech recognition or language processing module contained in memory 104 using processor 102 to process the digitized vocalization.

Character input device 110 is used by a user to input alphanumeric characters, symbols, spaces, etc., as a text entry into device 100. Additionally, character input device 110 can be used to make selections, move a cursor, scroll a page, navigate options and menus, and perform other functions. Although the character input device 110 could be a conventional keyboard, the present invention is most useful with computing devices 100 that have a limited character input device 110 that is generally smaller, has fewer keys, and limited functionality relative to conventional full-sized keyboards. Inputting characters using such limited character input devices 110 can be slow and cumbersome.

Limited character input devices 110 can take on many different forms. Some limited character input devices 110, which are typically used by PDA's, are formed by a touch-sensitive display, such as display 106. One such character-input device 110 is formed by displaying a miniature keyboard on the touch-sensitive display 106. The user can select the desired characters for text entry by touching the displayed character with a stylus in a similar manner as a conventional keyboard. Another such character input device 110 allows users to write characters on the display 106 or by designating input characters that are each mapped to a particular sequence of strokes that can be applied to touch-sensitive display 106 using the stylus. Once the user provides the text entry using either form of the input device 110, the text entry is provided on display 106.

Figure 2:
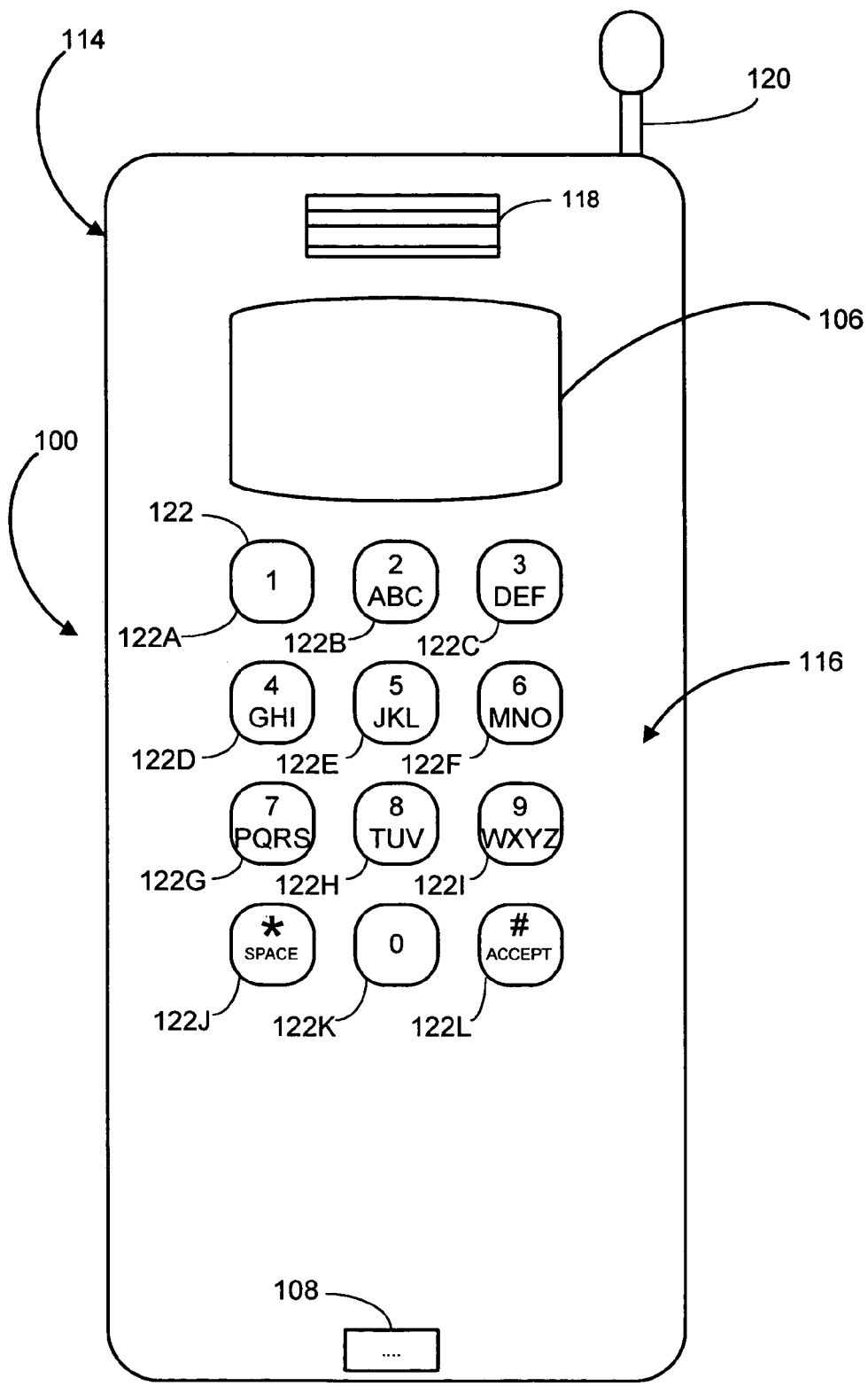
FIG. 2 is a schematic diagram of a mobile phone in which the invention can be used.

Mobile computing devices, such as mobile phones, utilize a limited character input device 110 in the form of a numeric keypad. FIG. 2 is a simplified diagram of a device 100 in the form of a mobile phone 114 that includes such a numeric keypad 116, a display 106 and a microphone 108. Mobile phone 114 can also includes a speaker 118, an antenna 120 as well as communications circuitry in the form of a transceiver (not shown) and other components, which are not pertinent to the present invention.

Numeric keypad 116 includes a number of numeric keys 122 and other keys. In general, numeric keypad 116 is distinguished from a standard keyboard in that it does not have a unique key for each character. As a result, numeric keypad 116 is a limited character input device 110. Keypad 116 has the following number of keys: a one key 122A, a two key 122B, a three key 122C, a four key 122D, a five key 122E, a six key 122F, a seven key 122G, an eight key 122H, a nine key 122I, and a zero key 122J. Numeric keypad 116 also has an asterisk (*) key 122K, and a pound sign (#) key 122L. Numeric keypad 116 may also have other specialized keys beyond those shown in FIG. 2, or fewer keys than those shown in FIG. 2. The keys 122 of numeric keypad 116 may be real, physical keys, or virtual, soft keys displayed on display 106, where display 106 is a touch-sensitive screen.

All of the number keys 122 of numeric keypad 116, except for the one key 122A and the zero key 122J, correspond to three or four letters of the alphabet. The two key 122B corresponds to letters A, B, and C. The three key 122C corresponds to the letters D, E, and F. The four key 122D corresponds to the letters G, H, and I. The five key 122E corresponds to the letters J, K, and L. The six key 122F corresponds to the letters M, N, and O. The seven key 122G corresponds to the letters P, Q, R, and S. The eight key 122H corresponds to the letters T, U, and V. Finally, the nine key 122I corresponds to the letters W, X, Y, and Z. Punctuation characters and symbols may be included either on unused keys, such as the one key 122A, or may be also included on the other number keys 122, along with the letters. Additionally, each number key 122 can be used to enter the number or symbol that is labeled thereon.

Mobile computing devices of the prior art, such as mobile phones, use the multiple-tap and single-tap methods to enter text into the device 100. Such methods can be cumbersome and inefficient, not only because of the need to provide at least one entry using keys 122 for each character of the text. Additionally, the single-tap method that often fails to recognize the word the user is trying to enter. For example, to enter the word "hello" the user presses the four key 122D, the three key 122C, the five key 122E twice and the six key 122F in succession. Because the number sequence entered 43556 may correspond to other words than the word "hello", the intended word is ambiguous. Additionally, the lexicon used by the device, which contains words that are matched to specific number sequences, may not contain the word that is desired to be entered by the user. This generally results in an out-of-vocabulary (OOV) error, which generally requires that the user change the text entry mode of the device from single-tap mode to multiple-tap mode and reenter the desired text entry from the beginning. As a result, the user may be forced to perform significantly more numeric key presses the number of letters contained in the word.

The present invention operates to significantly reduce the number of key presses that are required to enter the desired text into device 100 as compared to the methods of the prior art. This is accomplished through a combination of speech recognition with user input. The result is a text entry system that is simple, efficient and accurate.

Figure 3:
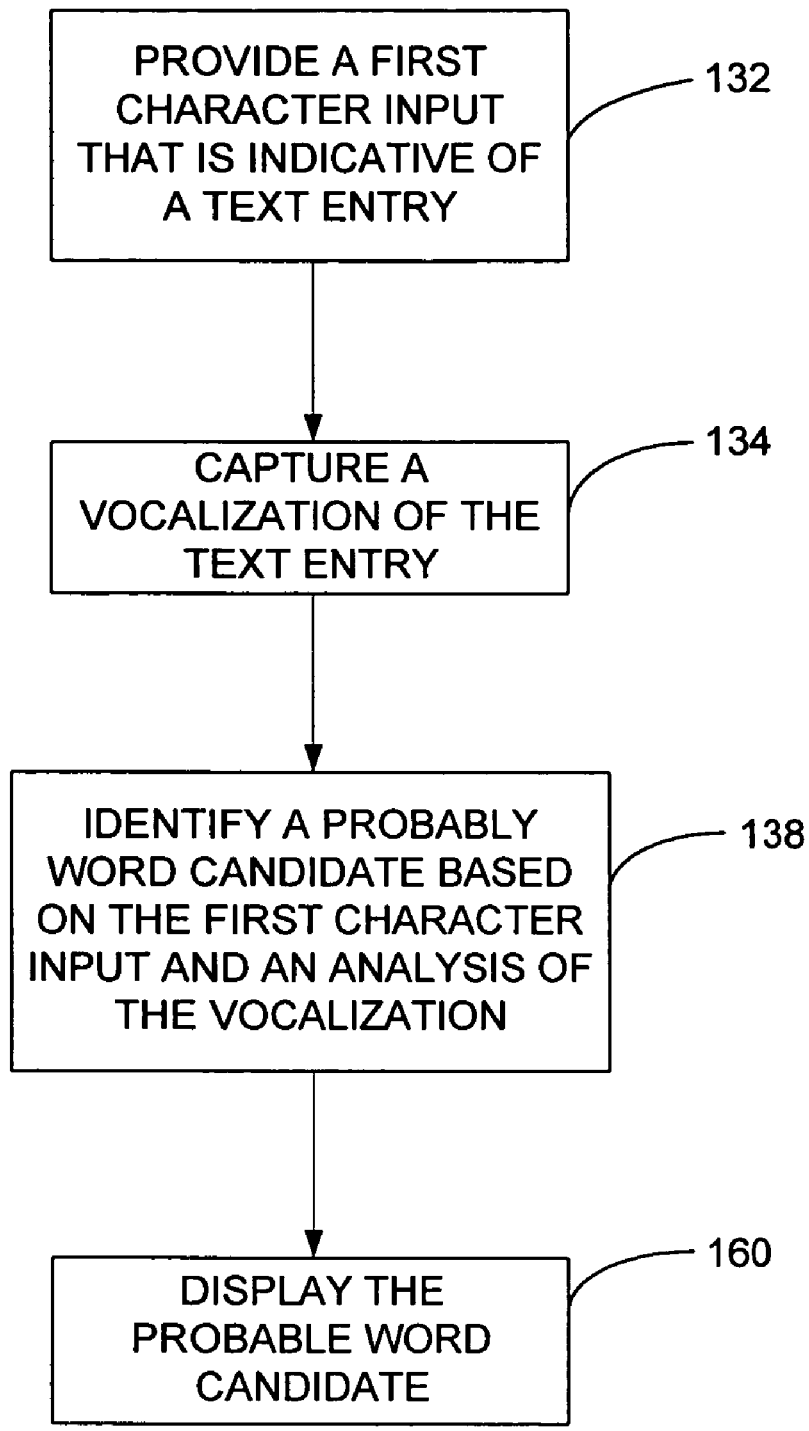
FIG. 3 is a flowchart illustrating a method for entering text into a device, in accordance with embodiments of the invention.
Figure 4:
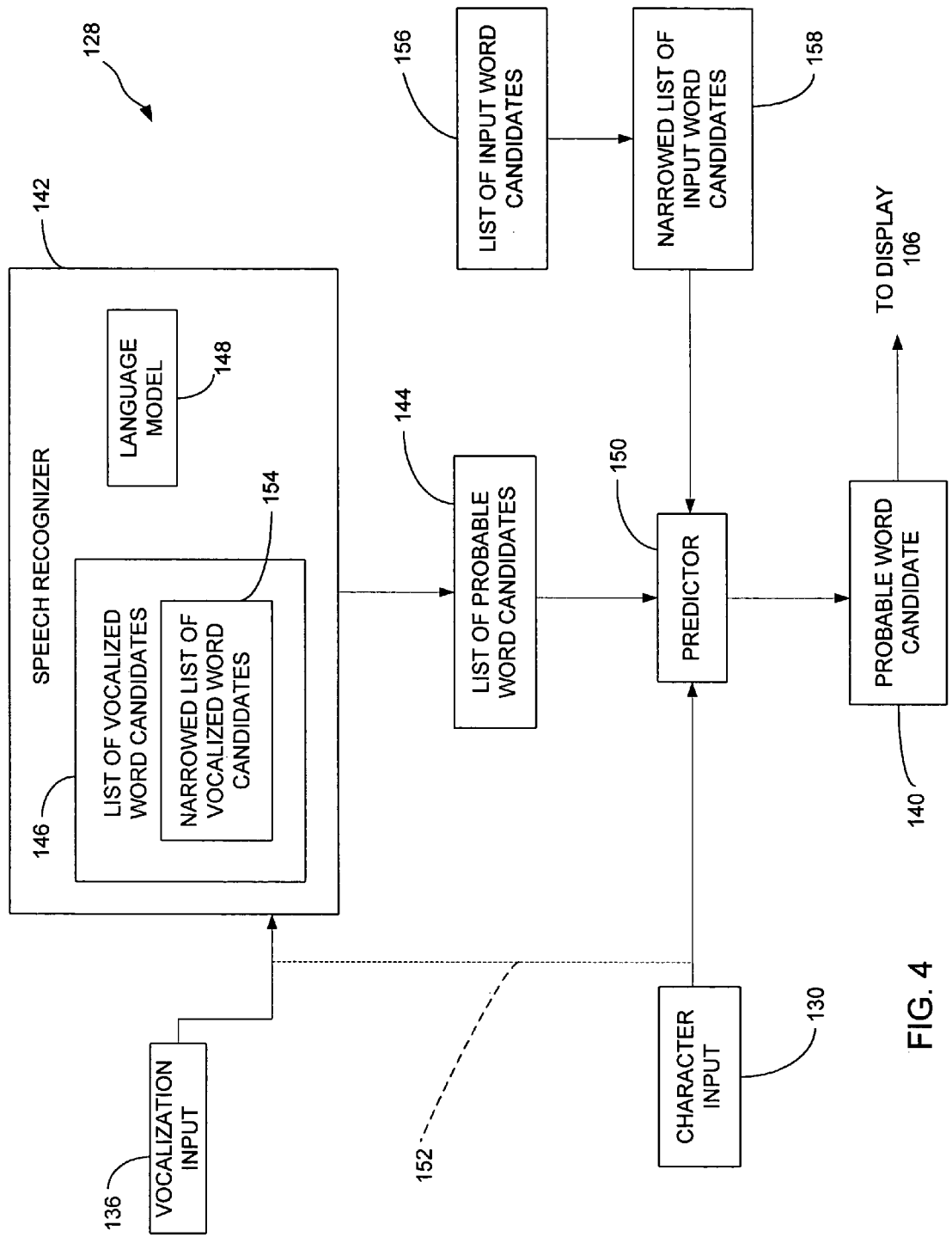
FIG. 4 is a block diagram of a exemplary system that can be used to implement the method of the invention.

FIG. 3 is a flowchart illustrating steps of the method in accordance with various embodiments of the invention. FIG. 4 is a block diagram of an exemplary system 128 that can be used to implement embodiments of the method on device 100. The components of system 128 generally correspond to program modules and instructions that are contained, for example, in memory 104 and are executable by processor 102 of FIG. 1 to perform the various steps of the method.

While the device 100 is set to a text entry mode, a first character input 130 is provided by the user, at step 132. The first character input 130 is indicative of the first character of a text entry that is desired to be input by the user. For example, when the desired text entry is "BERRY" the user provides a first character input 130 that is indicative of the letter "B".

The first character input 130 can be the actual first character of the text entry that is directly input by the user using, for example, the multiple-tap method on numeric keypad 116 (FIG. 2), a touch-sensitive display, a conventional keyboard, another type of input device 110 (FIG. 1), or other means. One disadvantage of this embodiment of the invention is that limited character input devices 110, such as the numeric keypad 116 may force the user to press a key 122 multiple times to enter the desired character, as explained above.

The first character input 130 can also be entered by the user in accordance with the single-tap method. Thus, for numeric keypad 116 the user must only press the key 122 corresponding to the desired character once. Thus, to enter "B" the user must simply press the two key 122B once. In accordance with this embodiment of the invention, the first character input 130 is representative of "B" as well as "A" and "C".

At step 134 of the method, a vocalization 136 of the text entry is captured. This is generally accomplished by the user speaking the text entry into microphone 108, which is digitized by A/D converter 112 and stored in memory 104 or otherwise processed by processor 102, in accordance with conventional speech recognition methods. Preferably, the vocalization 136 is captured after the first character input 130 has been provided by the user.

The capturing of the vocalization 136 can be triggered to begin in many different ways. Preferably, an indicator is provided by device 100 on, for example, display 106, to inform the user that vocalization of the text entry should begin. In accordance with one embodiment of the invention, the capturing step 134 begins in response to the user providing the first character input 130 at step 132 of the method. Accordingly, for the single-tap input method, the pressing of the numeric key corresponding to the first character of the text entry while in the text entry mode of the device 100 begins the capturing step 134. In accordance with another embodiment of the invention, the capturing step 134 begins with the pressing and holding of a key of the character input device 110. This is particularly useful for the single-tap method where only a single key is pressed to designate the first character input 130, but can be implemented along with the multiple-tap and other text entry input methods. Device 100 can also include a dedicated hard or soft key that is used to trigger the capturing step 132.

In accordance with another embodiment of the invention, the capturing step 134 may be configured to compensate situations where a user prematurely speaks before a key press or other vocalization capture triggering event is detected. One way to address this issue is to continuously buffer a few hundred milliseconds of any vocalization by the user in memory 104 while device 100 operates in the text entry mode. The buffered vocalization can be used to capture a "false start" vocalization of the text entry that began prior to the triggering event, which can be included as part of the vocalization input 136 that is provided to the speech recognizer 142 (FIG. 4) during the capturing step 134.

The capturing step 134 can be terminated by either the expiration of a predetermined period of time or by the release of the button or key that was held to begin the capture of the vocalized text entry. Alternatively, the capturing step 132 can be terminated after the system detects the termination of the vocalization of the text entry. When the capturing step 132 is terminated, device 100 preferably provides notice of such to the user such as by terminating the indicator that was provided upon the commencement of the capturing step 132.

In accordance with one embodiment of the invention, the text entry provided by the user must be in isolated or single word increments. Accordingly, the vocalization 136 of the text entry corresponds to the single or isolated text entry word. The process of entering text by selecting a first character input and speaking or vocalizing a single text entry word is somewhat natural when the single-tap method is used to enter the first character input 130. Additionally, single word text entry has its advantages in the mobile computing device context. In particular, less memory is required to temporarily store the captured vocalization 136. Additionally, less computational power is required to analyze the vocalization 136 and more accurate speech recognition results are possible, as will be discussed below.

In accordance with another embodiment of the invention, the text entry is provided by the user in the form of multiple words. Due to the generally limited memory capacity and processing power of mobile computing devices, the length of the text entry is preferably limited. Accordingly, the user is preferably only allowed to enter a short phrase or sentence. In accordance with one embodiment of the invention, the indicator that notifies the user of the start and end to the capturing step can be in the form of a timer (i.e., countdown timer) or the display of a bar that extends to indicate the elapse of time and the end of the capturing step 134. Both the single word and multiple word text entry embodiments of the present invention initially operate in substantially the same manner with respect to the first word of the text entry and the corresponding first word of the vocalization.

At step 138 of the method, a probable word candidate 140 is identified for a first word of the vocalization 136 of the text entry based upon the first character input 130 and an analysis of the vocalization 136. In general, the method operates to narrow a list of potential word candidates for the first word of the text entry (multiple word text entry mode) or the text entry word (single or isolated text entry mode) through the elimination of words that fail to match the criteria set forth by the first character input 130. For example, when a single-tap first character input 130 corresponds to multiple characters "ABC", for example, the list of potential word candidates can be pruned down to only those words that begin with either "A," "B," or "C". As a result, the system 128 of device 100 can not only produce more accurate results, but can produce results much more quickly than would be possible if all potential word candidates for the vocalization 136 were analyzed. This is particularly beneficial for mobile computing devices 100 that lack the processing power used by other computing systems that implement speech recognition systems.

The analysis of the vocalization 136 is generally performed by a speech recognizer 142 (FIG. 4). Speech recognizer 142 generally performs spectral analysis on digital samples of the vocalization 136 to identify a list of probable word candidates 144 from a lexicon or list of vocalized word candidates 146 that most likely correspond to the vocalization 136 of the text entry. Preferably the list of probable word candidates 144 produced by speech recognizer 142 are ranked in accordance with their likelihood of matching the vocalization 136.

Speech recognizer 142 can also include a language model 148 that can improve the accuracy of speech recognizer 142. Language model 148 operates to specify which sequences of words in the vocabulary are possible, or in general, provides information about the likelihood of various word sequences. Examples of language models are 1-gram, 2-gram, and N-gram language models. The 1-gram language model considers only the individual word probability whereas the 2-gram language model considers the preceding word in the text entry as having an influence on what the current vocalized word of the text entry is. Similarly, the 3-gram, 4-gram and N-gram language models consider the immediate two, three or N−1 words preceding the desired text entry in determining a match with the vocalization 136. Due to the general lack of processing power in mobile computerized devices 100, it may be necessary to limit the language model 148 to 1- or 2-gram language models.

The identifying step 138 is generally performed by a predictor module 150. In accordance with one embodiment of the invention, the predictor module 150 receives the list of probable word candidates 144 and the character input 130. The predictor module 148 identifies the probable word candidate 140 from the list of probable word candidates 144 based upon the first character input 130. Predictor 150 preferably selects the highest ranked word in the list of probable word candidates 144 having the character input 130 as its first letter, as the probable word candidate 140.

In accordance with another embodiment of the invention, the identifying step 138 is performed by first narrowing the lexicon or list of, vocalized word candidates 146 of the speech recognizer 142 using the first character input 130, as indicated by dashed line 152 in FIG. 4. As a result, the list of vocalized word candidates 146 is reduced to a narrowed list of vocalized word candidates 154 by eliminating all of the vocalized word candidates that fail to begin with the character or characters identified by the first character input 130. The narrowed list of vocalized word candidates 154 is further narrowed to form the list of probable word candidates 144 for the first word of the vocalization 136 based upon an analysis by the speech recognizer 142. As a result, the list of probable word candidates 144 that are provided to predictor 150 each begin with the character or characters identified by the character input 130. Predictor 150 then identifies the probable word candidate 140, which is preferably the highest ranked candidate in the list of probable word candidates 144.

Another embodiment of the identifying step 138 includes performing a single-tap analysis on the first character input 130. In general, the predictor 150 uses the first character input 130 to narrow a lexicon or list of input word candidates 156 to only those words having first characters that correspond to the first character input 130. In this manner, the list of input word candidates 156 is reduced to a narrowed list of input word candidates 158 for the first word of the vocalization 136. The predictor 150 then compares the list of vocalized word candidates 144 that are produced in response to the analysis of the vocalization 136 by the speech recognizer 142 to the narrowed list of input word candidates 158. Predictor 150 then identifies the probable word candidate 140 as the word candidate that is located in both the list of vocalized word candidates and the narrowed list of input word candidates. Preferably, the predictor 150 selects the probable word candidate 140 as the word having the highest rank in the list of probable word candidates 144 that has a match in the narrowed list of input word candidates 158.

In the final step 160 of the method, the probable word candidate 140 is displayed for the user on, for example, display 106 of device 100. Alternatively, multiple probable word candidates can be displayed for the user that satisfy the identifying step 138. The displaying of the probable word can be construed as an entry of the probable word candidate into device 100 even though it has yet to be accepted by the user.

The displayed probable word 140 can then be accepted to complete the text entry of the word or rejected by the user. Generally, the probable word candidate 140 is accepted and entered as the text entry into device 100 in response to a selection by the user. In accordance with one embodiment of the invention, the user enters the displayed probable word candidate 140 by pressing a hard or soft key on device 100. In accordance with one embodiment of the invention, the selection by the user is preferably performed by pressing one of the keys 122 of the numeric keypad that does not correspond to alphanumeric characters, such as the asterisk key 122K or the pound symbol key 122L. However, it should be understood that many conventional methods for making a selection can be used to enter the displayed probable word candidate.

Figure 5:
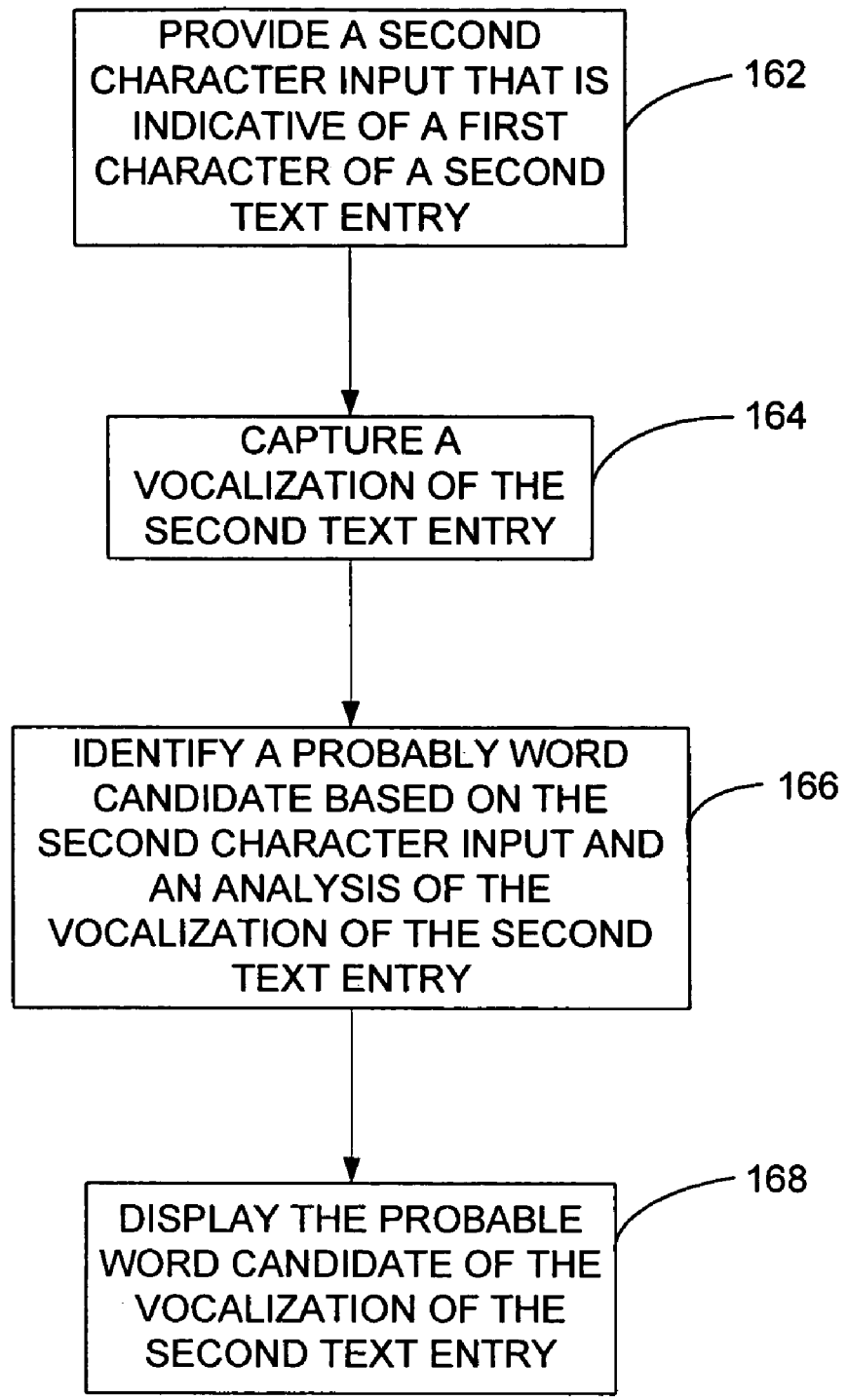
FIG. 5 is a flowchart illustrating a method of entering text into a device in accordance with embodiments of the invention.

When the user is entering text one word at a time and the displayed probable word is accepted by the user and entered, the method can continue in accordance with the flowchart of FIG. 5. At step, 162 the user provides a second character input that is indicative of a first character of a second text entry. The second character input can be provided in accordance with the procedures explained above for providing first character input 130. Next, at step 164, a vocalization of the second text entry is captured in the manner described above with respect to step 134 (FIG. 3). A probable word candidate is then identified for the vocalization of the second text entry, at step 166, based upon the second character input and an analysis of the vocalization of the second text entry. This step is performed substantially in the manner described above with respect to step 138 of the method of FIG. 3. Finally, the probable word candidate for the vocalization of the second text entry is displayed at step 168. The user then has the options of selecting or rejecting the displayed probable word candidate as described above.

The language model 146 of the speech recognizer 150 can take into account preceding words in the text entry to identify the current word that the user is attempting to enter. Accordingly, the step 166 of identifying a probable word candidate for the vocalization of the second text entry can be further based upon the previously entered probable word candidate 140.

Figure 6:
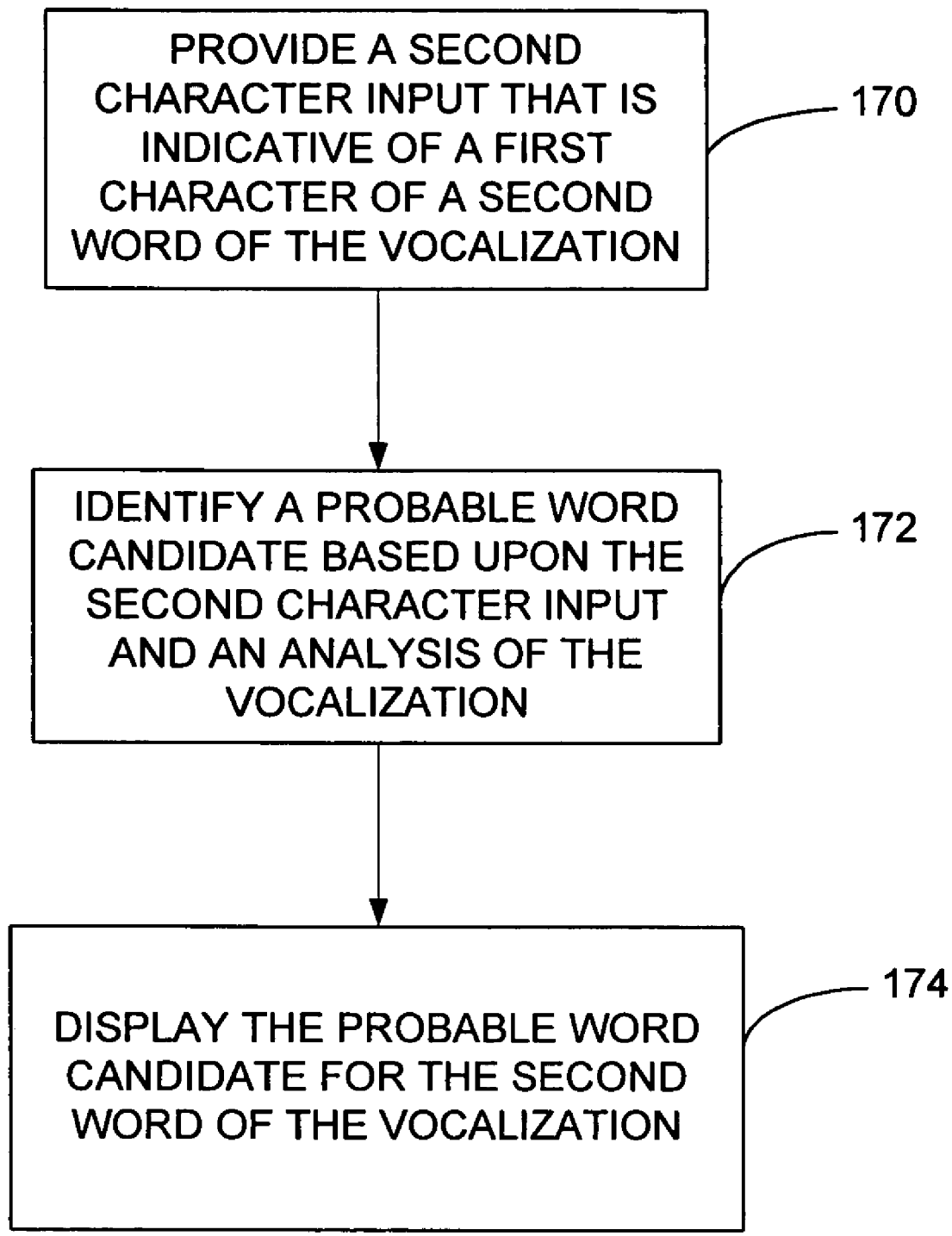
FIG. 6 is a flowchart illustrating a method of entering text into a device in accordance with embodiments of the invention.

When the user is entering text in the multiple word format, the displayed probable word is accepted by the user, and the words of the vocalization 136 have not all been identified, the method can continue in accordance with the flowchart of FIG. 6. At step 170 of the method, a second character input is provided that is indicative of a first letter of a second word of the vocalization 136 captured in step 134 of the method of FIG. 3. As mentioned above, the second character input can be provided in accordance with the procedures explained above for providing first character input 130. Next, at step 172, a probable word candidate for the second word of the vocalization 136 is identified based on an analysis of the vocalization 136 and the second character input. The probable word candidate is then displayed at step 174 for the user to either accept or reject. If the user accepts this probable word candidate, the method returns to step 170 and repeats until the words of the vocalization 136 are identified. As above, the step 172 of identifying a probable word candidate for the second word of the vocalization can be further based on the previously entered probable word candidate 140 using an appropriate language model 146 of speech recognizer 150.

As mentioned above, the user also has an opportunity to reject the displayed probable word candidate 140 by providing a suitable input. In accordance with one embodiment of the invention, a key is provided by device 100 that, when pressed, results in the rejection of the displayed probable word candidate 140. Such a key can be a soft key or a hard key of device 100. For example, where the asterisk key 122K is used to accept a displayed probable word candidate 140, the pound symbol key 122L can be used to reject the displayed probable word candidate. Many other methods of rejecting the displayed probable word candidate can be used as well.

In accordance with one embodiment of the invention, upon rejection of the probable word candidate by the user, one or more alternative probable word candidates that match the criteria of the identifying step 138 (FIG. 3) are displayed for the user in accordance with their rank. For example, when the desired word to be entered is "BURY", the probable word 140 displayed by the system 128 could be "BERRY". After the user rejects the displayed probable word, system 128 can display the most likely alternatives, such as the desired word "BURY" as well as "BARRY," for example. The user then is provided an option to select between the displayed alternative probable word candidates.

In accordance with another embodiment of the invention, the rejection of the displayed probable word candidate 140 occurs in response to the user providing a second character input that is indicative of a second character of the first word of the vocalization 136 of the desired text entry. The entry of the second character input can be made in the manner described above for the first character input 130. The system 128 of device 100 locates one or more alternative probable word candidates that satisfy the method implemented in step 138 (FIG. 3) and have first and second characters that correspond to the first and second character inputs. The alternative probable word candidates can then be displayed to the user for selection or rejection. This process can repeat by continuing to enter the third and subsequent characters of the text entry.

In the event that the displayed alternative probable words still fail to match the text entry word desired by the user, the mode of text entry for device 100 can be switched to the multiple-tap mode to allow the user to enter the desired word directly into device 100.

Although the present invention has been described with reference to particular embodiments, workers skilled in the art will recognize that changes may be made in form and detail without departing from the spirit and scope of the invention. Also, although most of the discussion here is centered around alphabetical languages such as English, those skilled in the art will recognize that the principles outlined in this invention are also applicable to other languages such as those in the East Asia whose input methods are not based on alphabets.

What is claimed is:

1. A method of entering text into a device comprising:
   a) providing a first character input that is indicative of a first character of a text entry word;
   b) capturing a vocalization of the text entry word;
   c) identifying a probable word candidate for the vocalization based upon the first character input and an analysis of the vocalization; and
   d) displaying the probable word candidate.

2. The method of claim 1, wherein the providing step a) includes pressing a key corresponding to multiple characters.

3. The method of claim 1, wherein:
   the providing step a) includes pressing and holding a key; and
   the capturing step b) begins in response to the providing step a).

4. The method of claim 1, wherein the identifying step c) includes:
   producing a list of probable word candidates based upon an analysis of the vocalization; and
   identifying the probable word candidate from the list of probable word candidates for the vocalization based on the first character input.

5. The method of claim 4 including:
   rejecting the probable word candidate in response to an input by a user; and
   displaying an alternative probable word candidate from the list of probable word candidates.

6. The method of claim 1, wherein the identifying step c) includes:
   narrowing a list of vocalized word candidates using the first character input to form a narrowed list of vocalized word candidates;
   narrowing the narrowed list of vocalized word candidates to a list of probable word candidates for the vocalization based upon an analysis of the vocalization; and
   identifying the probable word candidate from the list of probable word candidates.

7. The method of claim 1, wherein the identifying step c) includes:
   analyzing the vocalization to produce a list of vocalized word candidates;
   narrowing a list of input word candidates using the first character input to form a narrowed list of input word candidates for the vocalization;
   comparing the list of vocalized word candidates to the narrowed list of input word candidates; and
   identifying the probable word candidate as a word candidate that is located in both the list of vocalized word candidates and the narrowed list of input word candidates.

8. The method of claim 1 including providing a second character input that is indicative of a second character of the text entry word, wherein tbe probable word candidate identified in step c) is based on the first and second character inputs and the analysis of the vocalization.

9. The method of claim 1 including entering the probable word candidate into the device.

10. The method of claim 9 including:
    providing a second character input that is indicative of a first character of a second text entry word;
    capturing a vocalization of the second text entry word;
    identifying a probable word candidate for the vocalization of the second text entry word based upon the second character input and an analysis of the vocalization of the second text entry word; and
    displaying the probable word candidate for the vocalization of the second text entry word.

11. The method of claim 10, wherein the step of identifying a probable word candidate for the vocalization of the second text entry word is further based on the entered probable word candidate.

12. The method of claim 1, wherein providing a first character input that is indicative of a first character of a text entry word comprises pressing a key of a keypad of a mobile computing device that corresponds to the first character of the text entry word.

13. A method of entering text into a device comprising:
    a) providing a first character input that is indicative of a first character of a text entry;
    b) capturing a vocalization of the text entry;
    c) identifying a probable word candidate for a first word of the vocalization based upon the first character input and an analysis of the vocalization; and
    d) displaying the probable word candidate.

14. The method of claim 13, wherein the providing step a) includes pressing a key corresponding to multiple characters.

15. The method of claim 13, wherein the identifying step c) includes:
    producing a list of probable word candidates based upon an analysis of the vocalization; and
    identifying the probable word candidate from the list of probable word candidates for the first word of the vocalization based upon the first character input.

16. The method of claim 13 including providing a second character input that is indicative of a second character of the text entry, wherein the probable word candidate identified in step c) is based on the first and second character inputs, and the analysis of the vocalization.

17. The method of claim 13 including entering the probable word candidate into the device.

18. The method of claim 17 including:
    providing a second character input that is indicative of a first character of a second word of the vocalization;
    identifying a probable word candidate for the second word of the vocalization based upon the second character input and an analysis of the vocalization; and
    displaying the probable word candidate for the second word of the vocalization.

19. The method of claim 18, wherein the step of identifying a probable word candidate for the second word of the vocalization is further based on the entered probable word candidate.

20. The method of claim 13, wherein providing a first character input that is indicative of a first character of a text entry comprises pressing a key of a keypad of a mobile computing device that corresponds to the first character of the text entry.

21. A method of entering text into a mobile computing device by a user of the mobile computing device comprising:
    providing a first character input that is indicative of a first character of a text ently word comprising pressing a key of a keypad of the mobile computing device corresponding to the first character;
    vocalizing the text entry word into a microphone of the mobile computing device;

capturing the vocalization of the text entry word;

identifying a probable word candidate for the captured vocalization of the text entry word based upon the first character input and an analysis of the captured vocalization of the text entry word; and displaying the probable word candidate on the mobile computing device.

22. The method of claim 21, wherein identifying a probable word candidate for the captured vocalization of the text entry word comprises:

producing a list of probable word candidates based upon an analysis of the captured vocalization of the text entry word; and identifying the probable word candidate from the list of probable word candidates for the captured vocalization of the text entry word based on the first character input.

23. The method of claim 21, wherein identifying a probable word candidate for the captured vocalization of the text entry word comprises:

narrowing a list of vocalized word candidates using the first character input to form a narrowed list of vocalized word candidates;

narrowing the narrowed list of vocalized word candidates to a list of probable word candidates for the captured vocalization of the text entry word based upon an analysis of the captured vocalization of the text entry word; and identifying the probable word candidate from the list of probable word candidates.

24. The method of claim 21, further comprising entering the probable word candidate into the mobile computing device.

25. The method of claim 24, further comprising:

providing a second character input that is indicative of a first character of a second text entry word comprising pressing a key of a keypad of the mobile computing device corresponding to the first character;

capturing a vocalization of the second text entry word;

identifying a probable word candidate for the captured vocalization of the second text entry word based upon the second character input, an analysis of the captured vocalization of the second text entry word and the entered probable word candidate; and displaying the probable word candidate for the vocalization of the second text entry word on the mobile computing device.

* * * * *